United States Patent
Bockman et al.

[11] Patent Number: 6,081,344
[45] Date of Patent: Jun. 27, 2000

[54] DEVICE STATE ERROR DIFFUSION TECHNIQUE FOR HALFTONING

[75] Inventors: Francis E. Bockman; Guo Li, both of San Diego, Calif.

[73] Assignee: Hewlett-Packard Company, Palo Alto, Calif.

[21] Appl. No.: 08/960,779

[22] Filed: Oct. 30, 1997

[51] Int. Cl.[7] ............................................. G06F 15/00
[52] U.S. Cl. ................................ 358/1.9; 358/1.16
[58] Field of Search ............................... 395/109, 101, 395/104, 107, 114, 117; 358/520, 523, 524, 518, 529, 515, 1.9, 1.1, 1.4, 1.7, 1.15, 1.18, 1.16; 382/252, 167, 163, 166, 162

[56] References Cited

U.S. PATENT DOCUMENTS

| | | | |
|---|---|---|---|
| 5,375,002 | 12/1994 | Kim et al. | 358/521 |
| 5,381,246 | 1/1995 | Suzuki et al. | 358/500 |
| 5,508,826 | 4/1996 | Lloyd et al. | 358/501 |
| 5,717,839 | 2/1998 | Ichikawa | 395/109 |
| 5,742,405 | 4/1998 | Spaulding et al. | 358/523 |
| 5,799,136 | 8/1998 | Li et al. | 395/109 |

*Primary Examiner*—Madeleine Ahn-Vinh Nguyen

[57] ABSTRACT

A halftoning technique is disclosed which uses look-up tables to identify a combination of color ink drops (device states) to be printed by an inkjet printer. The look-up tables are indexed by a particular color to be reproduced. An error is also output by the look-up tables reflecting the difference between the indexing tone level and the printed color spot. The error is applied in a halftoning process to neighboring pixels. A plurality of look-up tables is used, and one of the look-up tables is selected for a particular medium (e.g., glossy paper, plain paper) to be printed upon. In this manner, the number and combination of ink drops can be optimize for a particular type of medium. In one embodiment, six different color inks are used by the printer.

15 Claims, 6 Drawing Sheets

DEVICE STATE ERROR DIFFUSION TECHNIQUE FOR HALFTONING

RELATED APPLICATIONS

Closely related patent documents include other, co-owned U.S. utility-patent applications filed in the United States Patent and Trademark Office substantially concurrently with this document. One is in the names of Francis E. Bockman and Guo Li, and identified as Hewlett-Packard Company docket number PD-10971818-1, and entitled "CONSTRUCTING DEVICE-STATE TABLES FOR INKJET PRINTING"—and subsequently assigned utility-patent application Ser. No. 08/960,766, filed Oct. 30, 1997. Another such document is in the names of Kevin R. Hudson and Thomas B. Prtichard, et al., and identified as Hewlett-Packard Company docket number PD-10971514-1, and entitled "Table Based Fast Error Diffusion Halftoning Technic"—and subsequently assigned utility-patent application Ser. No. 08/961,047, filed Oct. 30, 1997. A third related document filed Jan. 28, 1997, is U.S. patent application Ser. No. 08/789,859 in the name of Irene Heitsch, identified as Hewlett-Packard Company docket number PD-10960939-1 and entitled "IMAGE RENDITION BY PLURAL-ROW ERROR DIFFUSION, FOR FASTER OPERATION AND SMALLER INTEGRATED CIRCUITS"—and subsequently issued as U.S. Pat. No. 5,974,228 on Oct. 26, 1999. Other related documents are U.S. Pat. Nos. 5,070,413, in the names of James R. Sullivan, Rodney L. Miller and Thomas J. Wetzel and entitled "COLOR DIGITAL HALFTONING WITH VECTOR ERROR DIFFUSION"; U.S. Pat. No. 5,333,243, in the names of Jeffrey S. Best and Paul H. Dilfinger and entitled "METHOD FOR FORMING COLOR IMAGES, USING HUE-PLUS-GRAY COLOR MODEL AND ERROR DIFFUSION"; U.S. Pat. No. 5,473,446, in the names of Alexender Perumal, Jr. and Paul H. Dillinger and entitled "COLOR DIGITAL HALFTONING USING BLACK AND SECONDARY COLOR REPLACEMENT AND COLOR VECTOR DITHERING"; U.S. Pat. No. 5,594,481, in the name of Brian J. Keefe and entitled "INK CHANNEL STRUCTURE FOR INKJET PRINTHEAD"; and U.S. Pat. No. 5,621,545 in the names of Ricardo J. Motta and Gary J. Dispoto and entitled "IMAGE PRODUCTION USING COLOR ERROR DIFFUSION". Other relevant documents include Robert Ulichney, *Digital Halftoning* (MIT 1987, 1993), and particularly the discussion of three-dimensional vector-based error diffusion in that work. All of the documents mentioned above are hereby incorporated by reference in their entirety into this document.

FIELD OF THE INVENTION

This invention relates to display devices, such as inkjet printers, and, in particular, to a technique for reproducing an image using halftoning.

BACKGROUND OF THE INVENTION

In an inkjet printer, a color spot printed in a pixel position on a medium may consist of a number of overlapping dots of the same color ink or different color inks. As one example, a four color ink printer printing any combination of cyan, magenta, yellow, and black dots for a pixel position with, at most, one dot per color for a single pixel position can produce 16 different colors for a single pixel position without halftoning. If multiple drops (e.g., four) of the same color ink can be used when creating a color spot, the possible color combinations without halftoning can be over 10,000.

The possible color spots which can be printed by a particular printer is sometimes referred to as a palette of colors. Typically, the number of RGB colors that can be generated by a computer and displayed on the computer's display screen is much more than the palette of colors available for a particular printer. Thus, there will typically be some error between the color spot printed for a pixel and the ideal RGB color generated by the computer for that pixel position. Using error diffusion halftoning techniques, the error between the actual color printed by the printer and the true tone value to be reproduced for that pixel position is dispersed to nearby pixel positions. The colors then printed in those nearby pixel positions will compensate for the tone errors in other nearby color spots so that the overall tone in an area on the medium closely matches the true RGB tone generated by the computer.

Various things affect the accuracy of the image reproduction on the medium and the speed of generating the reproduction. For example, different types of media (e.g., glossy paper vs. coarse paper) absorb ink differently and thus affect the shade and size of the color spot. The error diffusion calculations which take into account the media type may be so complex as to be a bottleneck to the printing speed, and the optimum error diffusion may be different for different media. Other factors also limit the ability of the printer to accurately reproduce the RGB color tones while printing at a high rate of speed.

SUMMARY

In this disclosure, the term "device state" refers to a combination of color ink drops which can be printed by a printer to create a single color pixel. In one embodiment, the RGB values used to form an image created by a computer is converted to a CMY ink space. A look-up table is selected for a particular type of medium to be printed upon by an inkjet printer. The look-up table has memory locations indexed (or addressed) by a particular CMY color best matching the RGB color. The look-up table then, in response to such indexing, outputs a corresponding device state identifying the number of ink drops of each color to be printed by the printer for a particular pixel position to best match the indexing CMY color. The look-up table also outputs an error value corresponding to the error in tone between the indexing CMY color and the CMY value of the device state for the particular medium associated with the look-up table. As an example, for optimal color reproduction using a glossy medium with low ink absorption characteristics, a look-up table selected for that particular type of medium is programmed with device states consisting of color spots formed by up to 8 ink drops. Transitional colors between red and orange, for example, are composed of a similar number of drops so that the transition from red to orange will appear very smooth. In other words, nearby colors in a color ramp are composed of a similar number of ink drops to have similar color density, luminance, spot size, etc. Another look-up table will contain device states for plain paper color spots formed by at most 4 ink drops to obtain optimum print quality.

The error output from the selected look-up table is then diffused using any error diffusion weighting. The error is then used when selecting the next device state to be printed so that the overall tone value in an area closely matches the RGB color to be reproduced.

Further, in one embodiment, three, one-dimensional look-up tables are provided which are indexed by the CMY value which directly corresponded with the RGB value (or a color corrected RGB value). These look-up tables contain CMY values, termed major entries, which are a subset of all the possible colors which can be printed. The selected major entry is then used to index the device state look-up table previously discussed. This simplifies the look-up tables for the device states. The look-up tables that output the major entry CMY value also output error values reflecting the error between the ideal CMY indexing value and the selected major entry CMY value. The errors from the major entry look-up tables and device state look-up table are then added and diffused to neighboring pixels. When processing those neighboring pixels, the accumulated error is added to the CMY color corresponding to the RGB color for halftoning so that the overall tone in an area matches the RGB tone.

Other techniques for improving printed color accuracy include expanding the printer's CMY ink selection to include light cyan, dark cyan, light magenta, and dark magenta, and black, resulting in a 6 ink printer. For the present invention, the inks used only affect the device states stored in the look-up table.

Methods for generating the look-up tables are described along with a particular embodiment of the invention.

By using look-up tables containing preselected optimum device states and errors, rather than calculating the values in real time, the calculations may be extremely complex and take into account many more variables and factors than can be taken into account using a real-time processor. Other advantages result as will be explained.

DETAILED DESCRIPTION OF THE EMBODIMENTS

Figure 1:
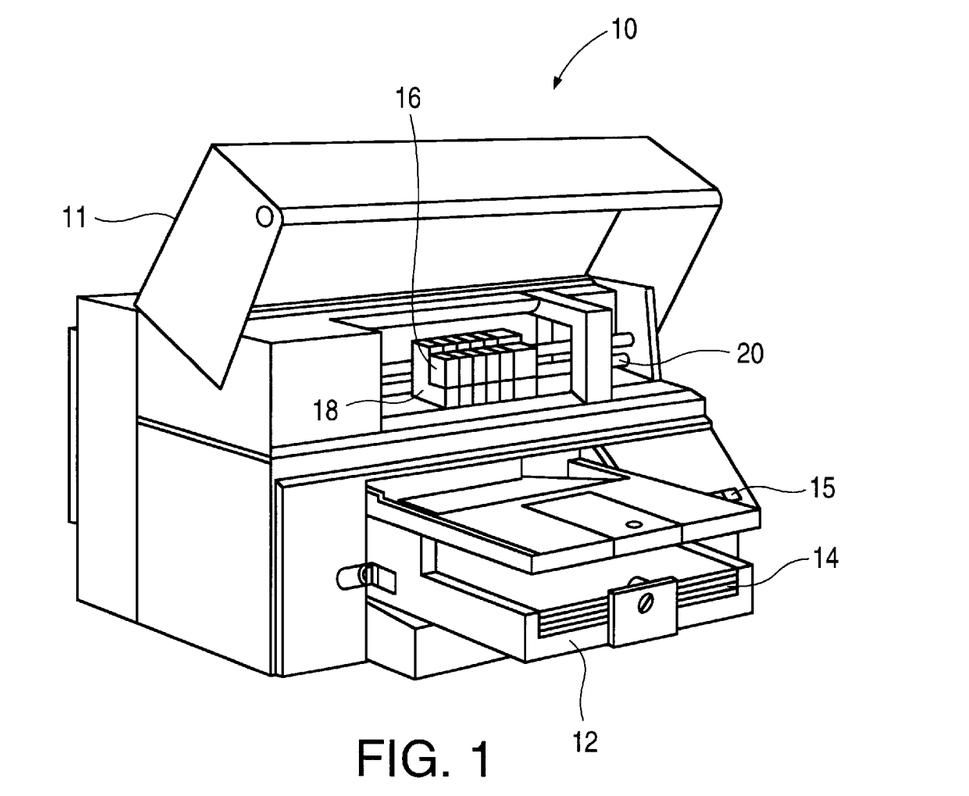
FIG. 1 illustrates an inkjet printer which incorporates at least a portion of the present invention.

FIG. 1 illustrates one type of color inkjet printer 10 which includes processing circuitry for performing all or part of the error diffusion method described herein. The color inkjet printer includes a cover 11, a paper tray 12 for holding virgin paper 14, an output tray 15 for receiving the printed pages, color ink print cartridges 16, and a scanning carriage 18 for sliding along a slide bar 20 while dots are being printed on the paper. In one embodiment, the color print cartridges 16 include light cyan (Cl), dark cyan (Cd), light magenta (Ml), dark magenta Md), yellow (Y), and black (K) ink print cartridges. Other combinations of ink, such as the more traditional CMYK or CMY ink print cartridges, may also be used. Further, a separate print cartridge need not be provided for each color ink; a single replaceable print cartridge may include two or more colors of ink with an associated array of ink ejection nozzles for each color. Also, the ink supply for each of the scanning printheads may be stationary and connected to the printheads by a tube. Inkjet print cartridges and inkjet printers are well known to those of ordinary skill in the art. U.S. Pat. No. 5,594,481, entitled Ink Channel Structure for Inkjet Printhead, to Brian J. Keefe et al., describes the structure of a suitable inkjet print cartridge. This patent is assigned to the present assignee and incorporated herein by reference.

Figure 2:
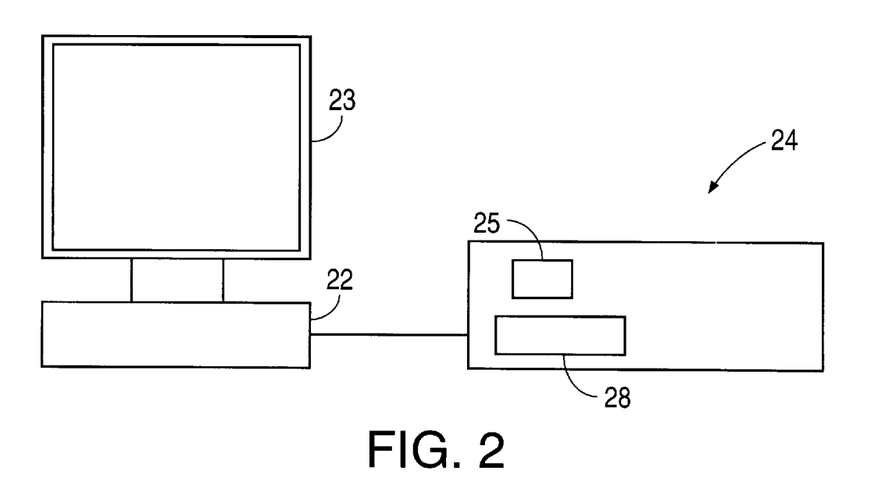
FIG. 2 illustrates a computer system and printer which incorporates the present invention.

FIG. 2 is a schematic diagram of a printing system which includes a host computer 22, a monitor 23 (e.g., a CRT), and a printer 24. Printer 24 could be any type of printer which prints color dots, including an inkjet printer. Printer 24 includes color print cartridges 25 which scan across a medium and print droplets of color ink as described below. Printer 10 of FIG. 1 may be substituted for printer 24 of FIG. 2.

Printer 24 includes a printer controller 28 which receives coded signals from computer 22 and provides firing signals to the print cartridges 25 to print color dots. The print cartridges may print at 300 dots-per-inch (DPI), 600 dpi, or any other resolution. If multiple drops of the same color ink are to be deposited over the same pixel position (or dot position) to print a multi-drop ink spot on a medium, the carriage containing print cartridges 25 may make multiple scans across the medium to print such overlapping dots.

The techniques described herein for converting an RGB image generated by computer 22 to ink droplets ejected from print cartridges 25 may be implemented using a combination of hardware and software, where portions of the hardware/software are incorporated in computer 22 and other portions located in printer 24. The location of the hardware/software for carrying out this method is a matter of design choice.

Figure 3:
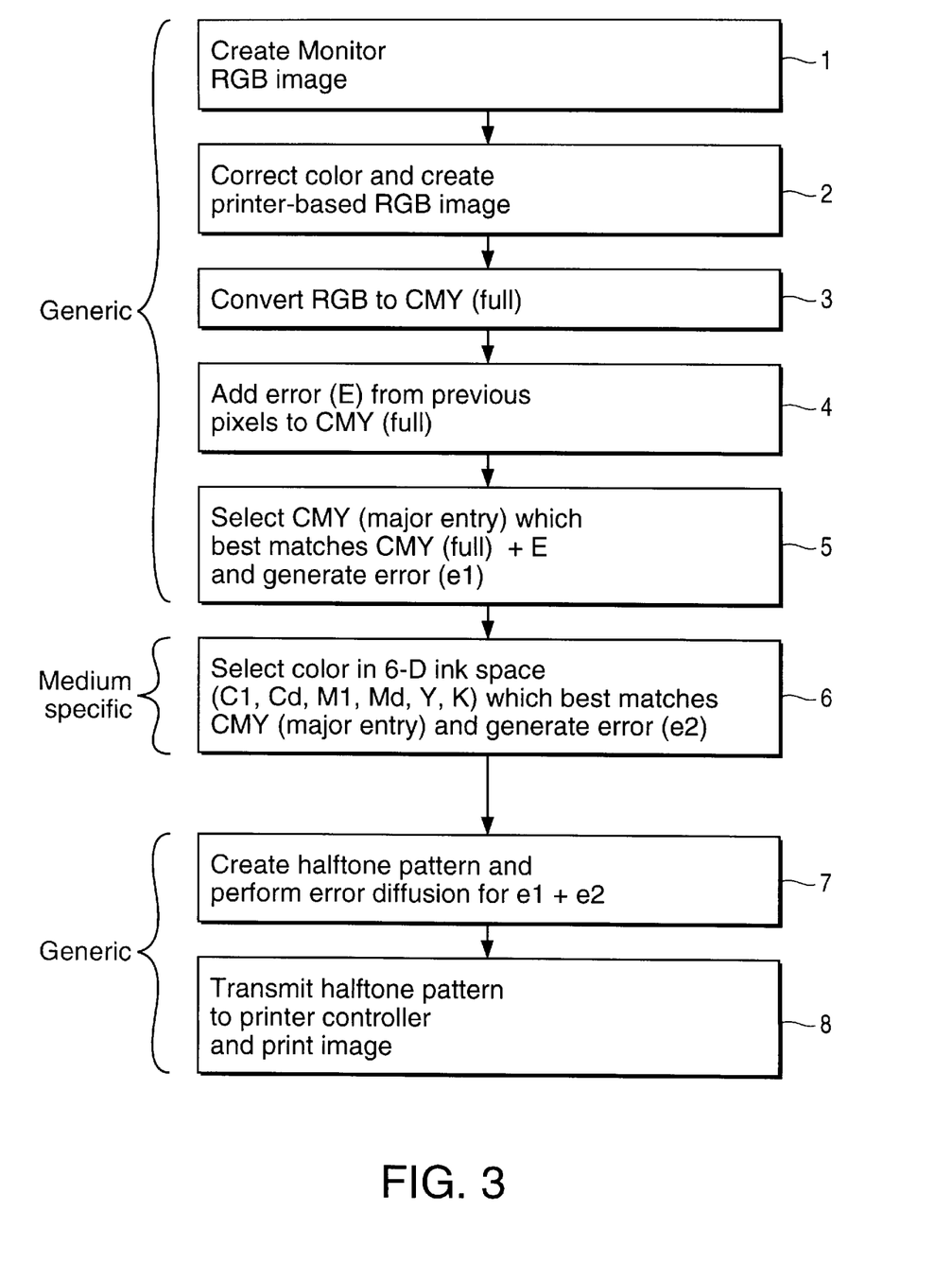
FIG. 3 is a flowchart showing the basic steps used in a halftoning process in accordance with one embodiment of the invention.

The general method carried out by the apparatus of FIG. 2, in one embodiment of the invention, is illustrated in the flowchart of FIG. 3. Details of each of these steps will be elaborated upon in the subsequent figures. It is assumed in the flowchart of FIG. 3 that the image to be printed by the printer is first generated in a personal computer; however, the original image may be generated by any other means.

In step 1 of FIG. 3, a color image is generated by a computer and displayed on a monitor using conventional means. A typical computer generates signals for a monitor to display the additive primary colors, red, green, and blue (RGB), which can be combined to produce millions of colors and also black. Typically, there are 256 levels of intensity for each primary color, such that each of the primary colors may be identified using an 8-bit byte. A typical computer monitor displays images at 75 dots per inch. The 24-bit RGB color image is held in the memory of computer 22 so that it can be displayed on monitor 23.

In step 2 of FIG. 3, the image in memory is converted to a 24-bit RGB image at the resolution of the printer 24. Inkjet printer 24 may have a resolution of 300, 600, or even 1200 dots per inch. Although a printer typically prints in CMY or CMYK subtractive colors, it is nevertheless convenient for imaging processing purposes in step 2 to consider the printer to be an RGB device. This conversion also performs color correction to compensate for the CMY ink colors and the inherent limitations of printing colors with ink. For example, some RGB colors on a monitor cannot be printed, so these RGB colors must be mapped to the closest color that can be printed. Such resolution conversion and color correction to best match the monitor color to a printed color is known in the art. Other techniques may be employed to instead directly convert the RGB coded image to a CMY coded image.

In step 3 of FIG. 3, the printer-based RGB color image map is converted into CMY color space using an inverter, a look-up table, or another means of conversion on a pixel by pixel basis. The fact that the matching CMY color is selected from the full range of CMY colors is designated by the term CMY (full). In one embodiment, each of the primary colors C, M and Y may also assume one of 256 levels, and each primary color is therefore represented by a byte.

Since most hard copy output devices, such as inkjet printers, cannot generate 256 levels of intensity for each of the printable inks (e.g., C, M, and Y) without halftoning, there will inherently be some error between the ideal tone level for a dot position and the tone of the actual printed dot on the medium. As will be described later, this error is generated and dispersed to nearby dot positions. The colors printed for the nearby dot positions are adjusted to compensate for the error in other nearby dot positions so that the overall tone in an area, rather than the individual color dots, closely match the "ideal" CMY color calculated in step 3.

In step 4, for a particular dot position, an error in tone from a nearby dot position is added to the ideal CMY color selected in step 3 for the particular dot position to create CMY (full) +E for that particular dot position.

In step 5, a CMY (major entry) color is selected which best matches the CMY (full)+E color from step 4. The CMY (major entry) is a color in a subset of the full range of CMY colors. Reducing the number of available colors at this stage reduces the memory needed to convert the original image to ink droplets on a medium. An error (e1) is generated which reflects the difference in tone between the selected CMY (major entry) and CMY (full)+E.

In the preferred embodiment of the invention, the colors available to be printed by a specific printer on a specific medium are in a pre-selected subset of all possible colors which the printer can actually print using multiple color drops for each dot position, and this subset of colors is referred to as a palette of colors or device states. Each color in the palette is assigned a CMY value. This palette of colors is selected based on various factors to be described in more detail later. One of these factors is that it is desirable that neighboring dots of similar colors be formed with about the same number of ink drops, such as 6–8 drops or 4–6 drops, etc., so as to provide similar visual characteristics, such as color intensity and color spot size. This results in a smooth color transition.

In step 6, using the major entry CMY values from step 5 as an index, a best-match color within the palette of colors is selected. In the preferred embodiment, the palette of colors is created using a combination of 6 inks which can be printed by the printer consisting of light cyan (Cl), dark cyan (Cd), light magenta (Ml), dark magenta (Md), yellow, and black inks. Using two levels of cyan and magenta reduces graininess, reduces the number of ink drops to be deposited in a dot position to achieve darker colors, provides added predictability of the printed color, and overall provides a more pleasing visual image.

Although the 6-ink combination of ink droplets in the palette for a dot position is selected to best match the selected CMY (major entry) color, there will be some error (e2) between the resulting printed tone for that dot position and the CMY (major entry) color. This error (e2) is generated.

In step 7, the errors e1 and e2 are added and diffused to nearby dot positions to form the error E referred to in step 4. Error diffusion techniques typically diffuse the error into 2, 3, or 4 neighboring dot positions. The colors to be printed for the various dot positions are selected such that the overall tone over a number of neighboring dot positions matches the original pixel tone in the original image. The result in step 7 is a representation of a halftone pattern of color dots which replicate the original RGB image. Any of the steps 2–7 may be performed in either the printer or the computer.

In step 8, the halftone pattern is transmitted to the printer controller 28 in FIG. 2 and further processed to convert the signals into energizing pulses for the 6 inkjet printheads in printer 10 or 24 to print the selected palette colors. Implementing such a printer controller would be within the skills of printer engineers since print controllers already exist for 3 and 4 ink printers. Multiple scans may be used to deposit overlapping dots of the same color ink in a single dot position.

As shown in FIG. 3, steps 1–5 and 7–8 are generic and may be used for any type of medium. Step 6, however, is tailored for a specific medium to be printed upon, as described in detail below.

In the particular embodiment described below, the use of 6 inks rather than the traditional 3 inks (CMY) or 4 inks (CMYK) cause halftoning and color control to become more complex. The complexity is amplified if consideration is made to optimizing the ink usage per pixel, constraining the ink colors to a maximum number of drops per pixel, creating similar ink colors to have about the same number of ink drops, and minimizing graininess by selecting color dots which do not visually contrast with nearby dots in a halftone pattern when attempting to cause the overall tone in an area to match that in the original image. In addition, for increased speed, it is desired to develop an algorithm that is amenable to a hardware implementation.

Figure 4:
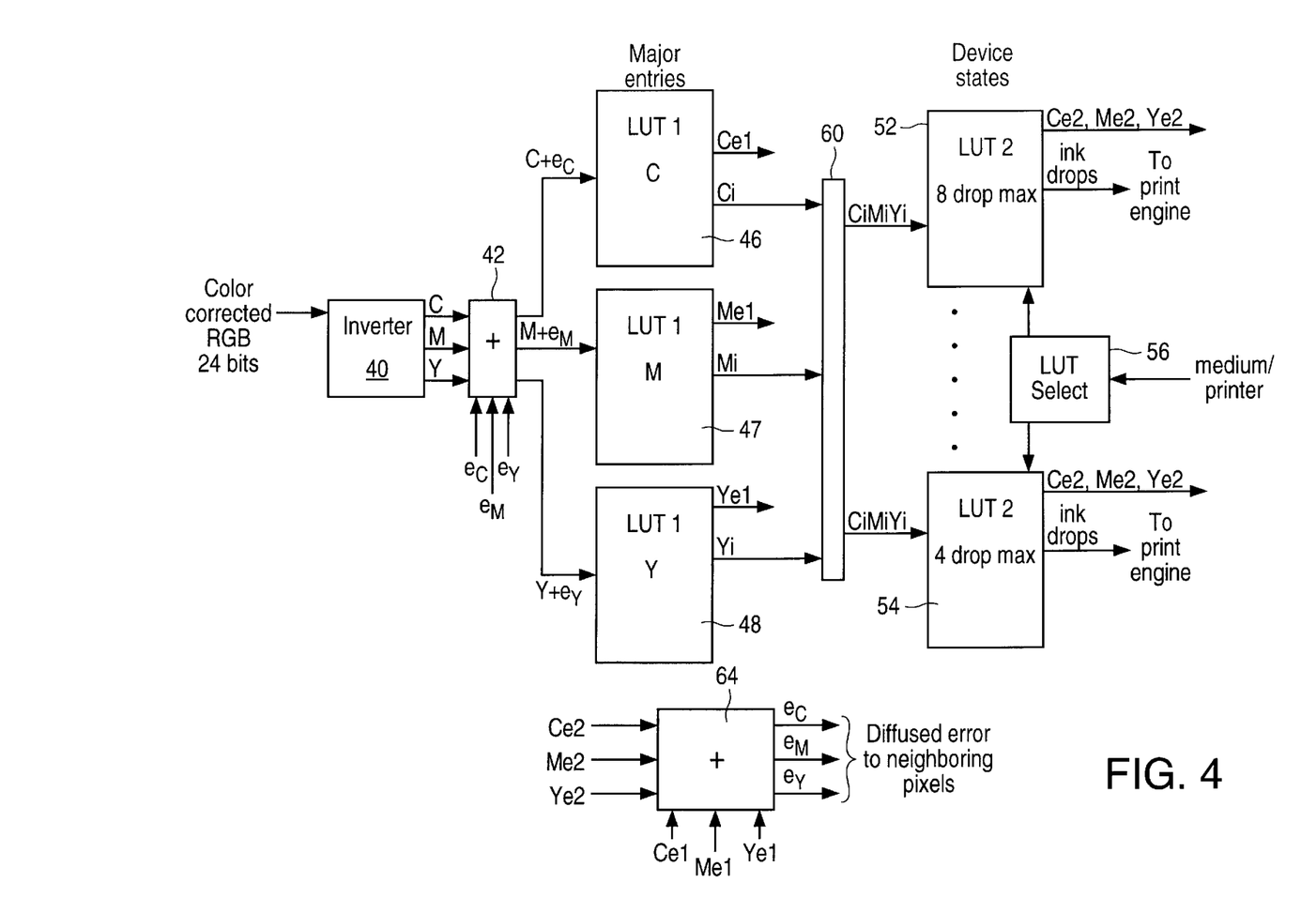
FIG. 4 illustrates a hardware or software based implementation of one embodiment of the invention.
Figure 5:
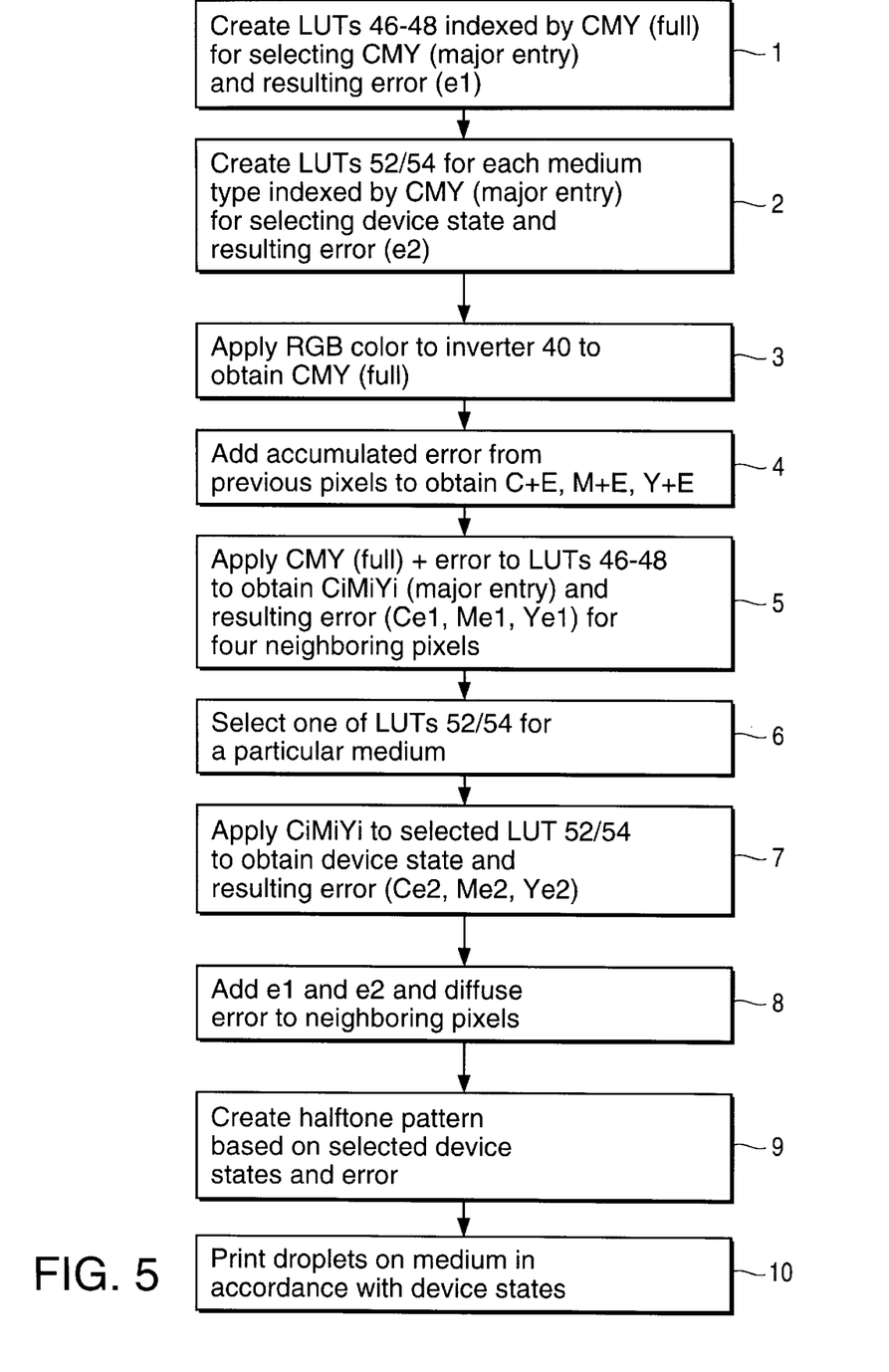
FIG. 5 is a flowchart showing the basic steps performed using the implementation of FIG. 4.

FIG. 4 illustrates a hardware or software implementation of the algorithm used for the novel error diffusion halftoning technique. FIG. 5 is a flowchart illustrating the basic steps used by the structure or algorithm of FIG. 4.

Instead of performing computations on a pixel-by-pixel basis, look-up tables are employed in the present invention. The look-up tables convert an indexing value, addressing one or more locations in the look-up table, to one or more output values. The computations for determining the optimum device state and the resulting error are performed when developing the entries for the look-up tables and, thus, the calculations and considerations involved in creating these look-up table entries may be extremely complex and even impossible to perform in real time at the desired rate of printing. These look-up tables may be implemented in hardware, as a ROM, or may be implemented in software. A software look-up table would use the indexing value to identify a particular line or lines of code containing the output value(s). One skilled in the art would understand how to implement a look-up table in software. Creating these look-up tables is identified in steps 1 and 2 of FIG. 5.

In FIG. 4, the 24-bit corrected RGB values for a particular dot position generated in step 2 of FIG. 3 are inverted by inverter 40 to create corresponding CMY values. For example, a red intensity value of 255 equals a cyan value of 0; a green value of 250 equals a magenta value of 5; and a blue value of 10 equals a yellow value of 245.

In another embodiment, the entire process shown in FIG. 4 may be carried out in RGB color space, and the processed RGB values inverted at the end of the process, or the conversion to ink color space may take place at any time during the process.

The inverted output of inverter 40 is an 8-bit value for cyan, an 8-bit value for magenta, and an 8-bit value for yellow. These values are applied to a summer 42. Summer 42 adds to these values diffused errors ($e_c$, $e_m$, $e_y$) generated by neighboring pixel positions which have already been processed (step 4). There are many types of error diffusion techniques which may be used with this present invention, although one particular error diffusion technique will be described later.

The error-compensated values for each CMY primary color are then applied to their associated look-up table 46, 47, and 48 (step 5). These look-up tables contain only a subset of the possible 256 tone levels for each color. The CMY colors in this subset are referred to as major entries. Limiting the tones to a subset of the 256 tones at this stage reduces the required memory space of the device state look-up tables 52 and 54, to be described later. Look-up tables 46–48 may be eliminated if much larger look-up tables 52 and 54 can be tolerated.

A tone error between the tone value applied to each of the look-up tables 46–48 and the closest major entry selected (Ci, Mi, Yi) is also output from each look-up table 46–48 as an error value (Ce1, Me1, Ye1). Each of these errors is diffused in accordance with the error diffusion technique used. In one particular embodiment, the error diffusion technique diffuses the error into four nearby pixels, such as the pixel directly to the right of the pixel being processed and the three adjacent pixels below the pixel being processed. The pixels in the image map are processed from left to right, row by row. A serpentine or other processing technique can also be used.

Different types of media absorb different amounts of ink. For example, ink deposited on the surface of a glossy photo quality medium does not significantly diffuse into the medium in contrast to ink deposited on a more coarse medium, such as plain paper. Ink which stays on the surface of the medium contributes more to the resulting color than ink which diffuses into the medium. Since ink dispersion within a photo quality medium is less than that in plain paper, up to 8 drops of ink may be used to create a single color spot on the photo quality medium without undesirable dispersion, while only four drops may be acceptable for plain paper. Therefore, a separate look-up table is prepared for each type of medium intended for use with the printer to optimize ink usage and optimize the visual quality of the image printed. Two such look-up tables are shown as look-up tables 52 and 54, although there may be many more look-up tables. A particular look-up table is selected by a selector 56 having a control signal which identifies a particular type of medium to be printed upon (step 6).

Selector 56 may be any decoder which receives a particular coded signal and outputs an enabling signal.

If the system of FIG. 4 is intended for any of a number of different types of printers, the look-up tables 52 and 54 may also be selected depending upon the type of printer being used as well as the type of medium. For example, some printers will only be suitable for printing color spots of 4 drops less. Further, some printers may only be able to print 3 or 4 colors rather than the 6 ink colors in the preferred embodiment. This requires the selection of a look-up table by selector 56 which contains device states appropriate for the printer being used.

The outputs of the 1-dimensional look-up tables 46–48 are combined by using a bus 60 or a software equivalent of a bus or other type of combiner so as to create a single 3-dimensional index or address (CiMiYi) for indexing one or more entries in the selected look-up table 52/54 (step 7). The ink drop combinations contained in look-up tables 52 and 54 may be experimentally determined to provide a wide range of printed color spots while optimizing ink usage and obtaining fairly uniform ink dispersion within the medium. One output of the selected look-up table 52/54 will be a code value identifying a color spot which consists of a particular combination of ink droplets selected from the available inks Cl, Cd, Ml, Md, Y, and K. This code value is then further processed by the printer controller 28 in FIG. 2 to convert this value into energizing pulses for ejecting the color ink droplets at precise times from the various print cartridges in the printer 24 as the print cartridges are scanning across the medium.

The selected look-up table 52/54 also outputs a second error value e2 for the color components C, M, and Y (step 7). This error e2 from the selected look-up table 52/54 is then summed by summer 64, shown in FIG. 4, with the error e1 from the major entry look-up tables 46–48. Summer 64 then outputs the resulting error signals ($e_c$, $e_m$, $e_y$) to be diffused to the neighboring pixels for use during subsequent processing of pixels (step 8). These diffused errors are then applied to summer 42 as previously described for the next pixel being processed. In one embodiment, one quarter of the total error for a particular pixel position is distributed (diffused) into four neighboring pixels, while in other error diffusion techniques the error is diffused in other ways to neighboring pixels as would be understood by those skilled in the art.

Figure 6:
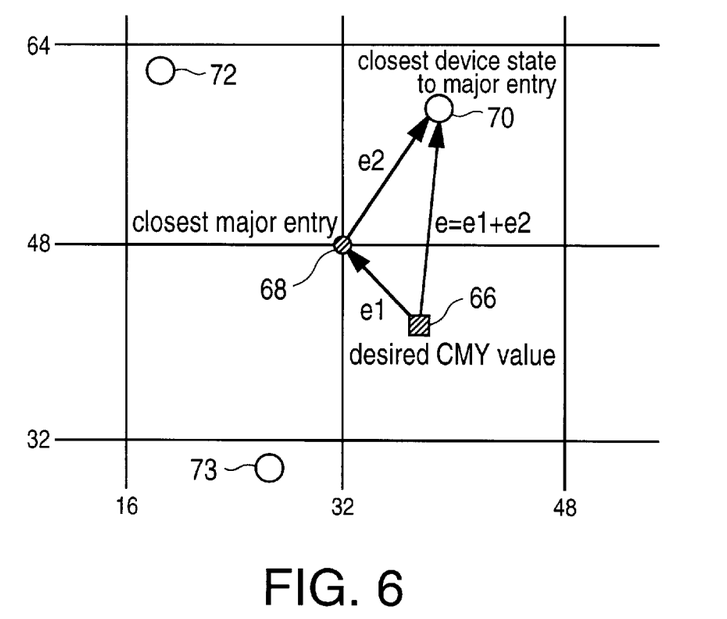
FIG. 6 illustrates the selection of a major entry and a device state given a desired CMY value.

FIG. 6 further illustrates the steps performed by look-up tables 46–48, 52, and 54. Although the indexing of the look-up tables is carried out in three dimensions by taking into account the tone levels for C, M, and Y, only two dimensions are shown in FIG. 6 for simplicity. The horizontal axis represents tone levels from 0–255 for a particular one of the colors C, M, or Y, and the vertical axis represents tone levels for another one of the colors C, M, or Y, where a point on the graph represents the tone values for two of the colors C, M, or Y. A third axis (in a cube) would represent the tone levels for the third color component. The desired 3-dimensional CMY value 66 is that applied to the look-up tables 46–48.

The closest major entry in the look-up tables 46–48 is identified as the CMY entry 68 in FIG. 6. An error for the C, M, and Y components is identified as e1. his closest major entry 68 is then applied to the selected look-up table 52/54 to elect a closest device state to the major entry, corresponding to a color spot 70 printed on the medium. The error between the closest major entry 68 and the color spot 70 printed is e2, with the total error between the desired CMY value 66 and the printed color spot 70 being the sum of e1 and e2. Other device states which have not been chosen in the selected look-up table are shown as device states 72 and 73.

In one embodiment, the steps 3–8 illustrated in FIG. 5 are carried out by a printer driver software program, initially contained in a computer readable medium such as a microdiskette, loaded into a personal computer or a printer.

Unlike conventional error diffusion which treats each of the color planes independently, the technique shown in FIGS. 4 and 5 considers each device state as a point in a 3-dimensional printer color space (CMY or RGB).

In step 9 of FIG. 5, a plurality of pixels for the image to be printed are arranged in a suitable image map to form a halftone pattern. The image provided in step 9 includes all the information about how many dots of each color are to be printed at each pixel location and the locations of the dots. When this halftone pattern is partially or fully completed, the coded values representing the halftone pattern are further processed by printer 24 to generate energization signals for the print cartridges to selectively print droplets of the 6 ink colors on the medium (step 10).

Controlling the overall error diffusion halftoning process in FIG. 5 may be performed by an ASIC. One skilled in the art, given existing systems, would understand how to implement the present invention after reading this disclosure.

Creation of Look-Up Tables

As seen by the above, the quality of the printed image is dependent upon the selection of the major entries and device states programmed into the look-up tables of FIG. 4. There are two main challenges when applying device state error diffusion to a high quality printer. The first is constructing an optimal palette of colors which are permissible to be printed by the printer. Selecting this palette of colors takes into account total ink usage, graininess of the resulting image, visual separation between colors, balanced use between inks, as well as other factors. The palette may consist of only a few hundred of the thousands of possible color spots which may be printed by the printer using 8 drops or less.

The second challenge is that, once a palette is chosen, the colors in the palette must be mapped to the 6 color ink space (Cl, Cd, MN, Md, Y, K) in which the palette is defined. This mapping needs to take into account at least the visual spacing of the colors across the printed image, the rate of change of colors across the printed image, and the spacing of the colors relative to other colors. Accordingly, the device states programmed into look-up tables 52 and 54 must offer a smooth transition between device states, among other factors, to obtain the most visually pleasing printed image. For example, although the same color may be obtained using a few different ink combinations, only the optimum ink combination should be programmed into look-up tables 52 and 54 to obtain the proper ink usage so as to have continuity of color density and hue.

The optimal mapping for the most pleasing image will change with different medias. Accordingly, when changing print modes for different medias, one simply downloads different look-up tables built with a suitable palette and device states. For example, glossy photo media print modes will use a palette generated with palette entries having 8 drops per pixel or less. Non-glossy photo project paper print modes use palette entries with 6 drops or less, and plain paper print modes will use 4 drops or less.

Since all possible output colors of the error diffusion process are contained in the palette, we can know in advance that no pixel will exceed a drop limit. It is difficult to make the same guarantees in independent color plane halftoning.

Minimizing graininess in the printed image is obtained by using only palette colors which are visually close to the actual printed color. For example, the densities of color spots in a similar color area after printing on a particular medium should be close to one another to avoid the color spots from standing out.

Another consideration in developing the various device states is to balance the ink usage across the device states so that one ink reservoir in the printer will not deplete significantly earlier than any other print reservoir. The device states should provide a smooth transition across the whole CMY space, and there should be little or no disturbing granularity variation across the whole CMY space.

Various ways to generate the device state look-up tables have been tested. They can be classified as: model based methods, measurement based methods, and combination methods. The table needs to associate/relate a 3-ink coordinate system (CMY) with a 6-ink coordinate system while inducing specific behavior in the color space.

Model based methods assign CMY values based on a certain model or assumption, which relates all or part of the device states. For example, one drop of dark cyan has the same C value as 5 drops of light cyan, and one light cyan plus one dark magenta has the C value of one light cyan and an M value of one dark magenta. Only the amount of ink put on the media is considered. The interaction between inks and media and other complicated physical affects may be ignored.

Measurement based methods assign CMY values to all device states based on their color measurements, no matter what contributes to the appearance of the color. All the possible device states are printed and measured. The possible device states form a volume with 8 corners (white, black, C, M, Y, R, G, B). This volume is then moved into a perfect cube in CMY space. The size of an ink drop in a uniform unhalftoned tile is different from in a halftone pattern due to the different load of inkjet pen in each case. Other factors also contribute to the non-smoothness, such as accuracy of measurement and the non-linear nature of CIELAB space and morfed space.

The table which created the best results is based on a combination method.

Figure 7:
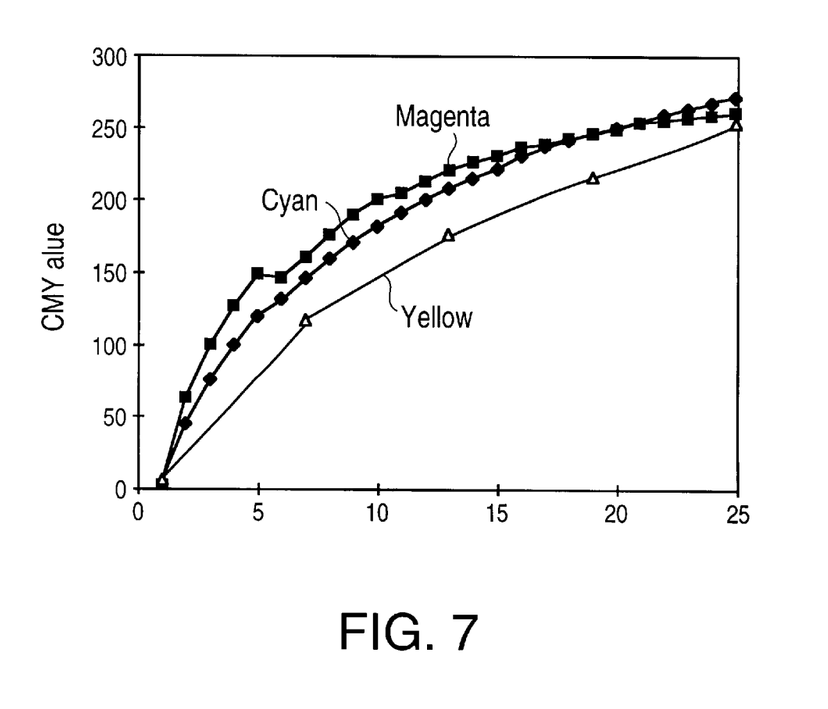
FIG. 7 is a graph of C, M, and Y intensity vs. the equivalent ink drop number, where the intensities are proportional to the CMY values assigned to each device state.
Figure 8:
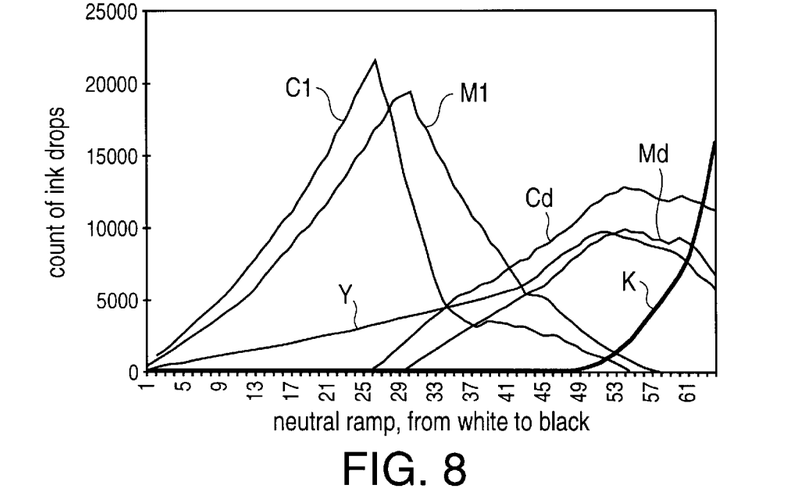
FIG. 8 is a graph showing the relative use of the ink colors in a neutral halftone ramp from white to black.
Figure 9:
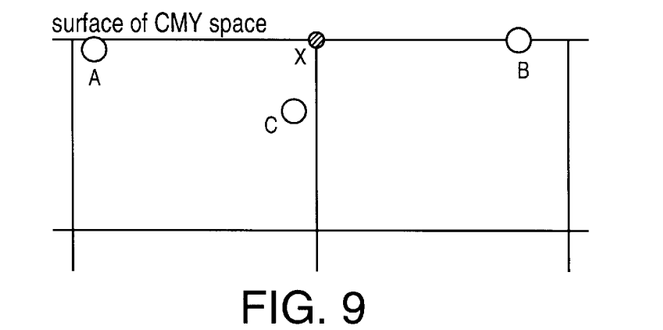
FIG. 9 illustrates the selection of a device state in CMY space.
Figure 10:
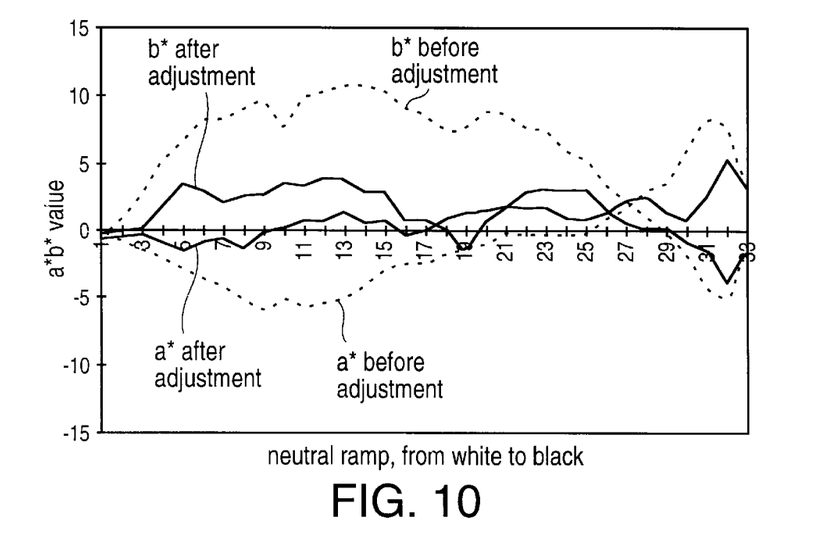
FIG. 10 is a graph of the a* (red-green) and b* (yellow-blue) attributes in a neutral halftone ramp.

The C, M, Y values for primary color ramps (C, M, Y) are generated based on the measurement results. An assumption is made that CMY inks always have the same C, M, Y value as they have in a corresponding primary color ramp. All the complicated interactions between different ink channels and between different inks and media are not considered. They are believed to have a minor effect compared to the amount of ink put on media. This method is relatively simple and reliable. This method for a 6-ink printing system basically consists of the following:

a. Print primary color tiles (white: non ink; yellow: 1 drop, 2 drop, 3 drop, 4 drop; cyan: 1 cl, 2cl, 3cl, 4cl, 1cd, 1cd1c1, 1cd2c1, . . . ). Then, assign CMY values based on the measurement of the primary color tiles as indicated in FIG. 7. FIG. 7 identifies the equivalent number of ink drops for each of the C, M, and Y intensities from 1–255. A single dark cyan or dark magenta ink drop is equivalent to 5 light cyan or 5 light magenta ink drops, respectively. Since there is only one yellow ink, the yellow ink drop range of 1–4 has been expanded to 1–25 so as to be better compared to the cyan and magenta graphs. Proper device states have to be chosen to be equivalent to Red, Green, Blue and Black. For example: 4Md+4Y is chosen as Red (C=0, M=255, Y=255).

b. Apply a certain limit to all CMY ink combinations. The maximum ink drop number per pixel that can be held on media is 8 for glossy media. Granularity need be also keep in mind in choosing device states. Any dark ink without light ink's companion is not preferred. Ink transition with sudden change of drop number such as from 4 drops of light ink to 1 drop dark ink has to be avoided.

c. Replace Cd/Md/Y ink combinations with black ink. A certain amount of non-black ink, ideally light ink, has to be left with black ink to insure a smooth transition. A CMY value may need proper modification due to the fact that 1 drop of black ink does not have exactly the same color as 1 composite Cd/Md/Y ink. In one example, the CMY values are decreased by 0% to 10% depending on their distance from the black corner. There is also a dilemma in the ink usage. Although light inks are good for transitions, extensive usage of light ink will result in light ink running out early. In order to avoid alternative usage of black ink and composite black (CMY), a fuzzy logic rule may be implemented to allow those major entries closer to black (CMY=255) to choose device states with more real black inks. The closer the major entries to the black corner, the higher its membership function value. A device state without real black will not be selected by a major entry in the dark region even if it has the desired CMY value. The final result of ink usage throughout a white-to-black neutral halftone ramp is shown in FIG. 8.

d. For most entries inside the CMY volume, search for the device states with the closest CMY values. For those on the surface of the CMY space, try to find device states closer to the surface rather than closer to the desired CMY. Otherwise, the error in the direction normal to the surface will accumulate and finally get clipped by the halftone table; the error between a selected CMY and a desired CMY will not be compensated in the error-diffusion process and will result in a big hole in the usable printer gamut. The process is indicated in FIG. 9, where device states A, B, C are available for entry X. Although C is closer to x, it is suggested to use A or B for entry X in order to generate the desired color. The reproduced color may look grainy if the surface is close to the dark end (CMY=255). If device state C is selected for X, the reproduced color will be wrong but look less grainy.

e. Measure 32 neutral tiles (0,0,0 . . . 255,255,255). The measured CIELAB values are applied to adjust CMY values assigned to all device states in order to achieve an acceptable white-to-black neutral ramp. For example, an a* value larger than 0 indicates the M value should be increased. The look-up table allows each device state entry to be selected by different CMY values. Our current result in the neutral region is delta E<5, where delta E is a unit of measure of color difference, between the desired color and the reproduced color as shown in FIG. 10. FIG. 10 shows the a* and b* values in a neutral halftone ramp before and after adjustment. A more positive a* value signifies that the color is redder, a more negative a* value signifies that the color is greener, a more positive b* value signifies that the color is yellower, and a more negative b* value signifies that the color is bluer.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A system for use in printing comprising:
    a plurality of device state look-up tables, each of said device state look-up tables being addressable by an input color tone value and outputting, in response to an addressing input color tone value, at least a first value indicative of a combination of ink colors to be printed by a printer on a medium and outputting a second value indicative of a tone error between said first value and said input color tone value, wherein said input color tone value is a major report color tone value; and
    a major entry look-up table for receiving in one of a plurality of color pixel input values and outputting a major entry color tone value, a number of said major entry color tone values in said major entry look-up table being fewer than said plurality of color pixel input values;
    an output of said major entry look-up table being provided to an input of a selected one of said device state look-up tables;
    said major entry look-up table also outputting a major entry error value reflecting an error between sad one of a plurality of color pixel input values and an outputted major entry color tone value.

2. The system of claim 1 further comprising a computer which generates an initial image comprised of red, green, and blue (RGB) color components, said system further comprising:
    a converter for converting a RGB tone value for a pixel in said initial image to said input color tone value for addressing a selected one of said device state look-up tables.

3. The system of claim 1 wherein said first value indicative of a combination of ink colors to be printed by said printer on said medium is for a particular pixel being processed for printing on said medium, said system further comprising:
    an error diffuser which diffuses said second value to pixels neighboring said particular pixel being processed.

4. The system of claim 1 further comprising a computer which generates an initial image comprised of red, green, and blue (RGB) color components, said system her comprising:
    a converter for converting a RGB tone value for a pixel in said initial image to said one of said plurality of color pixel input values for addressing said majority entry look-up table.

5. The system of claim 1 further comprising:
    a summer for adding said second value from said selected one of said device state look-up tables to said major entry error value to obtain a total error; and
    a diffuser for diffusing said total error to neighboring pixels.

6. The system of claim 5 further comprising a converter connected to an input of said major entry look-up table which converts red, green, and blue (RGB) tone values to a matching ink color combination.

7. The system of claim 6 wherein said converter is an inverter, and said summer is located between said inverter and said major entry look-up table.

8. The system of claim 1 further comprising a printer which converts electrical signals corresponding to said first value output by a selected one of said device state look-up tables to energizing signals for ejecting droplets of ink onto a medium.

9. The system of claim 8 wherein said first value output from a selected one of said device state look-up tables corresponds to a number of droplets of each primary color ink which can be printed by said printer.

10. The system of claim 9 further comprising a computer connected to said printer.

11. The system of claim 9 wherein said primary color ink includes light cyan, dark cyan, light magenta, dark magenta, yellow, and black.

12. The system of claim 1 wherein selection of one of said device state look-up tables is at least partially based on ink absorption characteristics of a medium to be printed upon.

13. The system of claim 1 further comprising a selector connected to said device state look-up tables, said selector selecting one of said look-up tables for a particular type of medium to be printed upon.

14. The system of claim 1 further comprising a selector connected to said device state look-up tables, said selector selecting one of said look-up tables for a particular type of printer.

15. The system of claim 1 further comprising a selector connected to said device state look-up tables, said selector selecting one of said look-up tables for a particular type of printer using a particular type of medium.

* * * * *

UNITED STATES PATENT AND TRADEMARK OFFICE
CERTIFICATE OF CORRECTION

PATENT NO   : 6,081,344

DATED       : June 27, 2000

INVENTOR(S) : Bockman et al.

It is certified that error appears in the above-identified patent and that said Letters Patent are hereby corrected as shown below:

At Column 12, Claim 4, line 18, after "system", delete "her" and insert in lieu thereof --further--.

Signed and Sealed this

Third Day of April, 2001

Attest:

NICHOLAS P. GODICI

Attesting Officer      Acting Director of the United States Patent and Trademark Office